(12) United States Patent
Kobayashi et al.

(10) Patent No.: US 11,486,481 B2
(45) Date of Patent: Nov. 1, 2022

(54) WAVE GENERATOR FOR STRAIN WAVE GEARING

(71) Applicant: HARMONIC DRIVE SYSTEMS INC., Tokyo (JP)

(72) Inventors: Syuhei Kobayashi, Azumino (JP); Daisuke Orii, Azumino (JP); Norio Shirokoshi, Azumino (JP); Hiroshi Yamazaki, Azumino (JP)

(73) Assignee: HARMONIC DRIVE SYSTEMS INC., Tokyo (JP)

(*) Notice: Subject to any disclaimer, the term of this patent is extended or adjusted under 35 U.S.C. 154(b) by 1 day.

(21) Appl. No.: 17/256,774

(22) PCT Filed: Aug. 30, 2018

(86) PCT No.: PCT/JP2018/032258
§ 371 (c)(1),
(2) Date: Dec. 29, 2020

(87) PCT Pub. No.: WO2020/044524
PCT Pub. Date: Mar. 5, 2020

(65) Prior Publication Data
US 2021/0140531 A1 May 13, 2021

(51) Int. Cl.
*F16H 49/00* (2006.01)
*F16C 35/06* (2006.01)
(52) U.S. Cl.
CPC .......... *F16H 49/001* (2013.01); *F16C 35/06* (2013.01); *F16C 2361/61* (2013.01)

(58) Field of Classification Search
CPC .................................................. F16H 49/001
(Continued)

(56) References Cited

U.S. PATENT DOCUMENTS 3,604,287 A * 9/1971 Humphreys ............ F16H 13/00
74/640
10,132,398 B2 * 11/2018 Kobayashi .............. B23P 15/14
(Continued)

FOREIGN PATENT DOCUMENTS

JP H01106629 U1 7/1989
JP H1992495129 U1 8/1992
(Continued)

OTHER PUBLICATIONS

International Search Report (with English Translation) and Written Opinion issued in corresponding International Patent Application No. PCT/JP2018/032258, 10 pages (dated Nov. 27, 2018).

*Primary Examiner* — Ha Dinh Ho
(74) *Attorney, Agent, or Firm* — Buchanan Ingersoll & Rooney PC

(57) ABSTRACT

In a wave generator for a strain wave gearing, a plug outer peripheral surface of a rigid wave plug has a non-circular profile and is fixed to an inner-race inner peripheral surface of a wave bearing by press-fitting and using an adhesive. The plug outer peripheral surface is a groove formation surface in which microgrooves are formed as adhesive-retaining grooves that can retain the adhesive. When the wave plug is press-fitted into the wave bearing, the amount of adhesive that is scraped out from therebetween is reduced and the bonding strength therebetween can be increased while also preventing unevenness of the bonding strength.

9 Claims, 5 Drawing Sheets

(58) Field of Classification Search
USPC .......................................................... 74/640
See application file for complete search history.

(56) References Cited

U.S. PATENT DOCUMENTS

| | | | |
|---|---|---|---|
| 10,508,729 B2* | 12/2019 | Kobayashi | ............ F16H 49/001 |
| 10,612,638 B2* | 4/2020 | Otsuka | .................... F16H 57/02 |
| 10,843,335 B2* | 11/2020 | Kusumoto | .......... F16H 57/0445 |
| 10,883,591 B2* | 1/2021 | Kobayashi | ............. F16C 33/26 |
| 10,955,039 B2* | 3/2021 | Shinao | .................. F16H 49/001 |
| 10,989,276 B2* | 4/2021 | Moritani | .................... F16H 1/06 |
| 2018/0187764 A1 | 7/2018 | Handa et al. | |

FOREIGN PATENT DOCUMENTS

| | | |
|---|---|---|
| JP | 2010065761 A | 3/2010 |
| JP | 2018096456 A | 6/2018 |
| WO | 2017006442 A1 | 1/2017 |

* cited by examiner

Circumferential Direction

Circumferential Direction

Axial Direction
(Width Direction)

Axial Direction
(Width Direction)

Axial Direction
(Width Direction)

Circumferential
Direction

Axial Direction
(Width Direction)

Circumferential
Direction

Axial Direction
(Width Direction)

Circumferential
Direction

WAVE GENERATOR FOR STRAIN WAVE GEARING

TECHNICAL FIELD

The present invention relates to a strain wave gearing having a wave generator provided with a wave plug and a wave bearing. More specifically, the present invention relates to a wave generator in which the force with which a wave plug secured to a wave bearing is pulled out is increased by press-fitting and using an adhesive.

BACKGROUND ART

A known example of a wave generator for a strain wave gearing is one provided with a rigid wave plug and a wave bearing mounted on an ellipsoidal external peripheral surface of the wave plug. The wave plug and the wave bearing are secured together by press-fitting and using an adhesive. In a flexurally meshing gearing (strain wave gearing) disclosed in Patent Document 1, an inner race member (inner race of a wave bearing) is secured by adhesion or press-fitting to a vibromotive body (wave plug).

PRIOR ART LITERATURE

Patent Documents

[Patent Document 1] JP-A 2018-96456 (paragraph 0017)

SUMMARY OF THE INVENTION

Problems to be Solved by the Invention

To increase force with which a wave bearing and a wave plug are joined, the two members are secured together by press-fitting and adhesion. In this case, to improve workability when press-fitting the wave plug into the wave bearing, an adhesive is applied to only an inner-race inner peripheral surface of the perfectly circular wave bearing, in which state, an ellipsoidal external peripheral surface of the wave plug is press-fitted into the inner-race inner peripheral surface. The wave bearing is forcibly caused to flex into an ellipsoidal shape by the press-fitting of the wave plug. During press-fitting, the ellipsoidally contoured plug external peripheral surface of the wave plug slides in the axial direction while outwardly pressing the inner-race inner peripheral surface of the wave bearing. The adhesive applied to the inner-race inner peripheral surface is scraped out in the axial direction by the plug external peripheral surface. During press-fitting, a large amount of adhesive is scraped out from between the inner-race inner peripheral surface and the plug external peripheral surface. Therefore, the adhesive effect between the wave bearing and the wave plug decreases and becomes uneven.

With the foregoing in view, it is an object of the present invention to provide a wave generator for a strain wave gearing in which, when a wave plug is press-fitted into a wave bearing, the amount of adhesive scraped out from therebetween is reduced, the adhesive effect therebetween is increased, and unevenness in the adhesive effect can be prevented.

Means Used to Solve the Problems

To solve the above-mentioned problems, a wave generator for a strain wave gearing of the present invention is characterized by comprising a rigid wave plug and a wave bearing, an inner-race inner peripheral surface of the wave bearing being secured by press-fitting and using an adhesive to a non-circularly contoured plug external peripheral surface of the wave plug, and the plug external peripheral surface and/or the inner-race inner peripheral surface having a groove formation surface in which adhesive-retaining grooves capable of retaining an adhesive are formed.

In the present invention, adhesive-retaining grooves are formed in the plug external peripheral surface and/or the inner-race inner peripheral surface. The adhesive between the plug external peripheral surface and the inner-race inner peripheral surface is retained in the adhesive-retaining grooves during the press-fitting of the wave plug. Appropriately forming the adhesive-retaining grooves enables the necessary amount of adhesive to be retained between the plug external peripheral surface and the inner-race inner peripheral surface after press-fitting. The force with which the wave plug and the wave bearing are joined is increased, and unevenness in the joining force can also be minimized. Consequently, unevenness in the force with which the wave plug is pulled out of the wave bearing can be reduced while the pulling-out force is improved.

In the present invention, microgrooves being of no greater than micrometer-order width and depth can be used as the adhesive-retaining grooves. Additionally, first-direction arrangement patterns, in which microgrooves extend in straight lines or curved lines in the same direction (a first direction) at a fixed pitch, are formed in the groove formation surface. Alternatively, intersecting arrangement patterns are formed, which are intersections of first-direction arrangement patterns in which microgrooves extend in straight lines or curved lines in a first direction at a fixed pitch, and second-direction arrangement patterns in which microgrooves extend in straight lines or curved lines in a second direction at a fixed pitch.

The arrangement patterns of microgrooves formed in the groove formation surface are highly wettable and allow the amount of adhesive scraped out during press-fitting to be reduced. As a result, after press-fitting, the amount of adhesive remaining between the wave bearing and the wave plug can be increased, and the force with which the wave plug is pulled out can be improved and stabilized. Arrangement patterns of microgrooves being of no greater than micrometer-order width and depth can be formed in the plug external peripheral surface and the inner-race inner peripheral surface by, for example, lasering processing using a femtosecond laser.

When the wave generator is provided with a wave plug in which an ellipsoidally contoured plug external peripheral surface is formed, a flexible externally toothed gear is caused to flex into an ellipsoidal shape. The externally toothed gear meshes with a rigid internally toothed gear in portions where the long axis of the ellipsoidal shape is positioned. Considerable stress is generated in portions where the two gears mesh. In a wave generator in which the externally toothed gear is held in an ellipsoidally flexed state, considerable surface pressure bears on the portions where the long axis of the ellipsoidal shape is positioned, and substantially no surface pressure bears on the portions where the short axis is positioned.

Therefore, in the groove formation surface, it is preferable for the depth to be reduced in microgrooves formed in portions where the long axis of the ellipsoidal shape is positioned, considerable surface pressure bearing on these portions, and for microgrooves formed in portions where the short axis of the ellipsoidal shape is positioned to be made deeper, so as to be able to retain a greater amount of adhesive, these portions being where little surface pressure bears.

MODE FOR CARRYING OUT THE INVENTION

An embodiment of a wave generator for a strain wave gearing to which the present invention is applied is described below with reference to the drawings. The description below is an example in which the present invention is applied to a wave generator for a top-hat-type strain wave gearing. The present invention can be similarly applied to a wave generator for a cup-type strain wave gearing or a flat-type strain wave gearing.

Figure 1A:
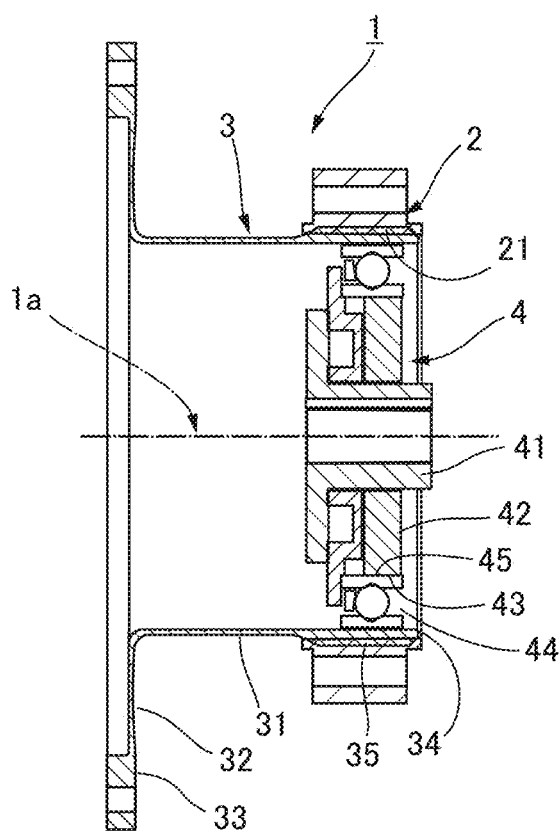
FIGS. 1(a) to 1(b) show a schematic longitudinal cross-sectional view and a schematic end surface view of one example of a strain wave gearing to which the present invention is applied.
Figure 1B:
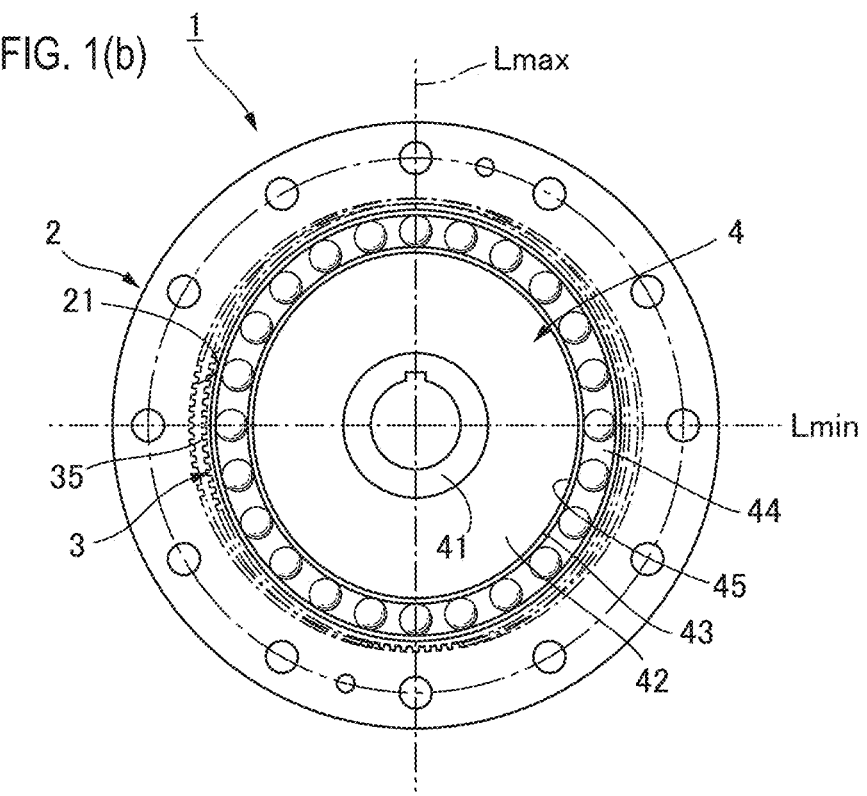

FIG. 1(a) is a schematic longitudinal cross-sectional view of an overall configuration of a top-hat-type strain wave gearing (referred to below simply as a "strain wave gearing"), and FIG. 1(b) is a schematic end surface view of the same. A strain wave gearing 1 is configured from an annular rigid internally toothed gear 2, a top-hat-shaped flexible externally toothed gear 3 coaxially disposed on an inner surface thereof, and an ellipsoidally contoured wave generator 4 fitted into an inner side of the externally toothed gear 3.

The externally toothed gear 3 is provided with a barrel part 31, a diaphragm 32, and a boss 33, and overall has the shape of a top hat. The barrel part 31 has a cylindrical shape and is capable of flexing radially. One end of the barrel part 31 is an open end 34, and external teeth 35 are formed in an external peripheral surface portion of the barrel part in the side having the open end 34. The diaphragm 32 widens outward in the radial direction in continuation from the other end of the barrel part 31. The annular boss 33, which has a rectangular cross-section, is formed in continuation from an external peripheral edge of the diaphragm 32. The boss 33 is a rigid portion for attaching the externally toothed gear 3 to another member (not shown). The internally toothed gear 2 is disposed in a state of encircling the external teeth 35 of the externally toothed gear 3. The external teeth 35 are able to mesh with internal teeth 21 formed in an inner peripheral surface of the internally toothed gear 2.

The wave generator 4 is configured from a hollow hub 41, an ellipsoidal rigid wave plug 42 fitted on an external periphery thereof, and a wave bearing 44 fitted on an ellipsoidal plug external peripheral surface 43 of the wave plug 42. A portion in the barrel part 31 of the externally toothed gear 3 where the external teeth 35 are formed is caused by the wave generator 4 to flex from the initial perfectly circular shape to an ellipsoidal shape. The external teeth 35 mesh with the internal teeth 21 of the internally toothed gear 2 in positions at both ends of a long axis $L_{max}$ of the ellipsoidal shape.

When the wave generator 4 rotates about a center axis 1a, the meshing positions of the gears 2, 3 rotate in the circumferential direction. Due to this rotation, relative rotation occurs between the externally toothed gear 3 and the internally toothed gear 2 in accordance with the difference between the number of external teeth 35 and the number of internal teeth 21. For example, if the internally toothed gear 2 is fixed and the wave generator 4 is a high-speed rotating input element, the externally toothed gear 3 is a reduced-speed rotation output element and reduced rotational output is achieved in accordance with the difference in the number of teeth between the gears 2, 3.

Figure 2A:
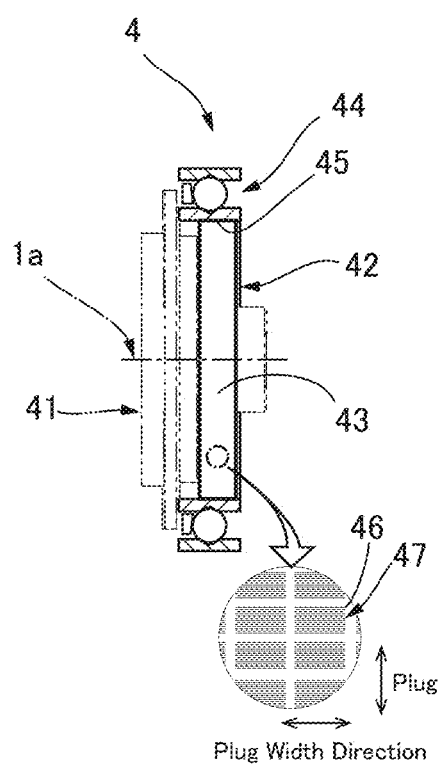
FIGS. 2(a) to 2(b) show an illustrative representation and a schematic end surface view of a wave plug and a wave bearing of a wave generator.
Figure 2B:
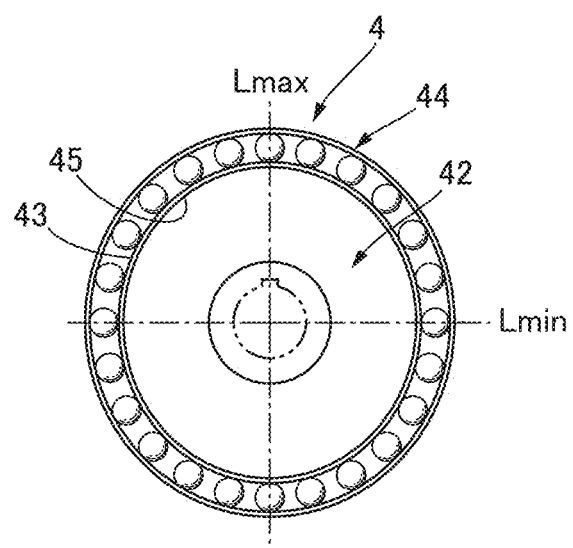

FIG. 2(a) is an illustrative representation of the wave plug 42 and the wave bearing 44 of the wave generator 4, and FIG. 2(b) is a schematic end surface view of the same. The ellipsoidally contoured plug external peripheral surface 43 of the wave plug 42 is fixed to an inner-race inner peripheral surface 45 of the wave bearing 44 by press-fitting and using an adhesive. The plug external peripheral surface 43 and/or the inner-race inner peripheral surface 45 have/has a groove formation surface in which adhesive-retaining grooves capable of retaining an adhesive are formed.

For example, the plug external peripheral surface 43 of the wave plug 42 is a groove formation surface, and formed therein as adhesive-retaining grooves are microgrooves 46 being of no greater than micrometer-order width and depth. The microgrooves 46 can be formed by, for example, laser processing using a femtosecond laser. The microgrooves 46 of the present example are formed in the plug external peripheral surface 43 such that arrangement patterns 47 of the microgrooves 46 are formed at fixed intervals in a plug circumferential direction and a plug width direction (the direction of the center axis 1a). In each individual arrangement pattern 47, microgrooves 46 extending linearly in the plug width direction (the direction of the center axis 1a) are arranged at a fixed pitch in the plug circumferential direction.

In the wave generator 4 of the strain wave gearing 1 of the present example, the ellipsoidal plug external peripheral surface 43 of the wave plug 42 is a groove formation surface in which microgrooves 46 functioning as adhesive-retaining grooves are formed. After the wave plug 42 has been press-fitted into the wave bearing 44, the amount of the adhesive retained therebetween can be increased. During press-fitting, some of the adhesive flows along the microgrooves 46 and the amount scraped out to the exterior decreases. Consequently, unevenness in the force with which the wave plug 42 is pulled out can be reduced, and the lower limit value of the pull-out force can be increased.

(Various forms of Groove Formation Surface)

FIGS. 3(a) to 3(g) show illustrative representations of examples of arrangement patterns of microgrooves formed in the groove formation surface. The groove formation surface in which the microgrooves 46 are formed can be the plug external peripheral surface 43 of the wave plug 42, the inner-race inner peripheral surface 45 of the wave bearing 44, or both surfaces 43, 45.

Figure 3A:
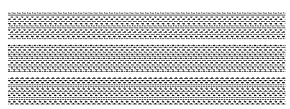
FIGS. 3(a) to 3(g) show illustrative representations of arrangement patterns of microgrooves in a groove formation surface.
Figure 3B:
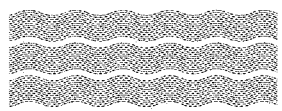

In the groove formation surface, the microgrooves 46 are formed in a predetermined pitch and a predetermined direction, in arrangement patterns extending in straight lines or curved lines. For example, in the groove formation surface as shown in FIG. 3(a), the microgrooves 46 can form, at a fixed pitch, arrangement patterns extending in straight lines in a circumferential direction of the groove formation surface (in a circumferential direction of the plug external peripheral surface 43 or the inner-race inner peripheral surface 45). Additionally, in the groove formation surface as shown in FIG. 3(b), the microgrooves 46 can form, at a fixed pitch, arrangement patterns extending in undulations in the circumferential direction.

Figure 3C:
Figure 3B:
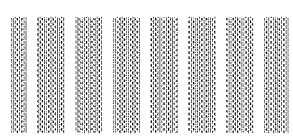
Figure 3D:
Figure 3B:
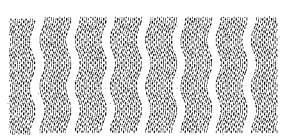
Figure 3E:
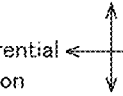
Figure 3B:

In the groove formation surface as shown in FIG. 3(c), the microgrooves 46 can form, at a fixed pitch, arrangement patterns extending in straight lines in the axial direction (the width direction of the plug external peripheral surface 43 or the inner-race inner peripheral surface 45) orthogonal to the circumferential direction of the groove formation surface. In the groove formation surface as shown in FIG. 3(d), the microgrooves 46 can form, at a fixed pitch, arrangement patterns extending in undulations in the axial direction orthogonal to the circumferential direction of the groove formation surface. Additionally, in the groove formation surface as shown in FIG. 3(e), the microgrooves 46 can form, at a fixed pitch, inclined arrangement patterns extending in straight lines in an oblique direction inclined relative to the circumferential and axial directions of the groove formation surface.

Figure 3F:
Figure 3B:
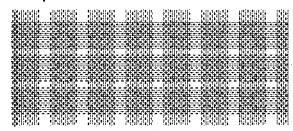
Figure 3G:
Figure 3B:
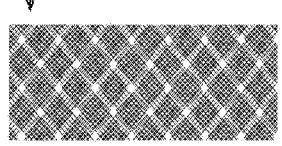

In the same groove formation surface as shown in FIGS. 3(f) and (g), the microgrooves 46 can form intersecting arrangement patterns, which are intersections of first-direction arrangement patterns extending in a first direction and arranged at a fixed pitch, and second-direction arrangement pattern grooves extending in a second direction different from the first direction and arranged at a fixed pitch. In the intersecting arrangement patterns shown in FIG. 3(f), the first-direction arrangement patterns are composed of microgrooves 46 extending in straight lines in the circumferential direction, and the second-direction arrangement patterns are composed of microgrooves 46 extending in straight lines in the axial direction. In the intersecting arrangement patterns shown in FIG. 3(g), the first-direction arrangement patterns are inclined arrangement patterns formed from linear microgrooves 46 extending in a direction inclined 45 degrees relative to the circumferential direction and the axial direction, and the second-direction arrangement patterns are inclined arrangement patterns formed from linear microgrooves 46 extending in a direction inclined 45 degrees in an inverse direction relative to the circumferential direction and the axial direction. Furthermore, intersecting arrangement patterns that are an overlapping of the arrangement patterns shown in FIG. 3(a) and the arrangement patterns shown in FIG. 3(b) can also be formed in the groove formation surface.

Figure 4A:
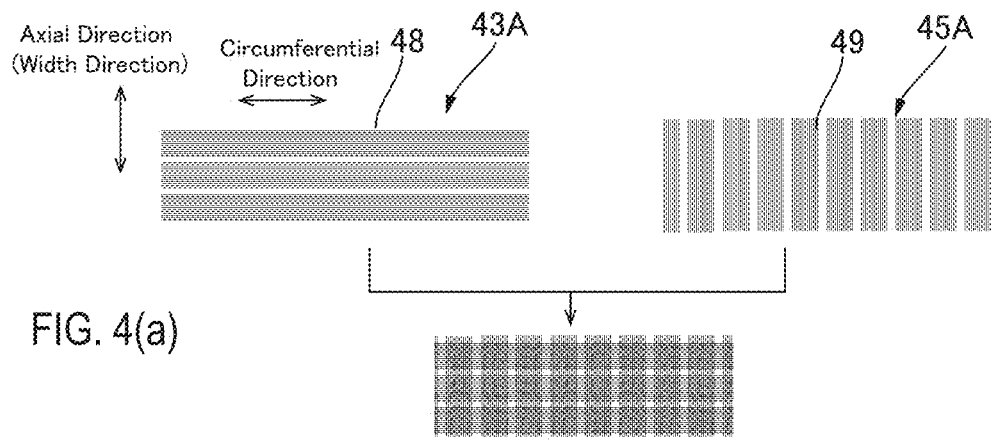
FIGS. 4(a) to 4(c) show illustrative representations of arrangement patterns of microgrooves in first and second groove formation surfaces.
Figure 4B:
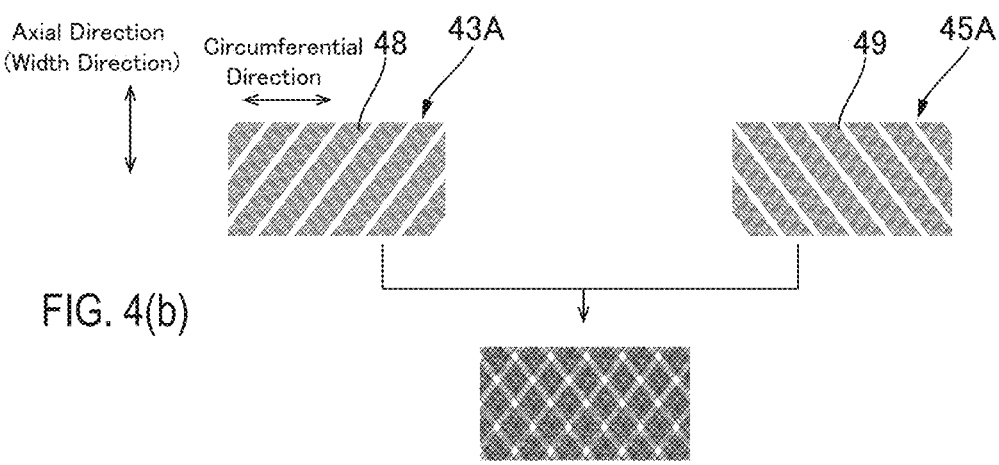
Figure 4C:
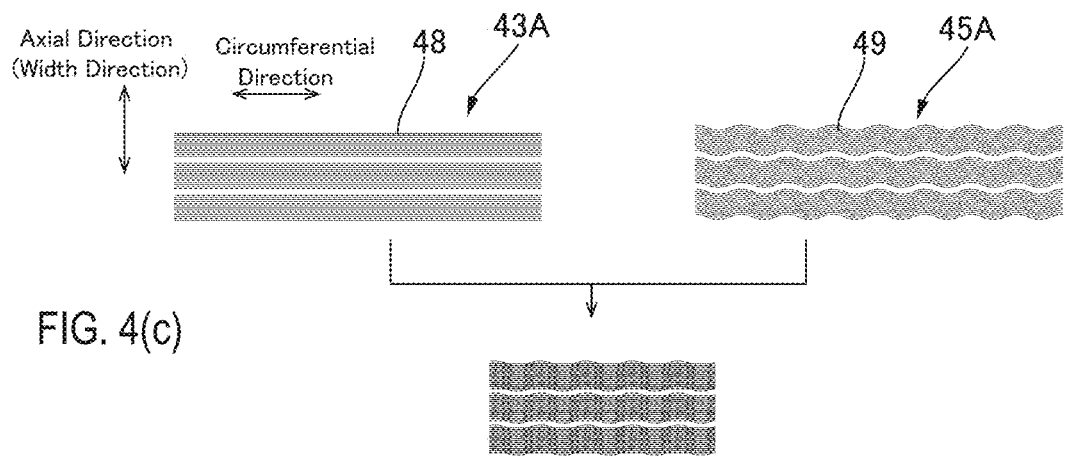

FIGS. 4(a) to 4(c) show illustrative representations of examples in which the plug external peripheral surface 43 of the wave plug 42 is a first groove formation surface and the inner-race inner peripheral surface 45 is a second groove formation surface. In these cases as well, the adhesive-retaining grooves formed in the first and second groove formation surfaces can be microgrooves being of no greater than micrometer-order width and depth. Microgrooves can be formed in the same patterns as those shown in FIGS. 3(a) to 3(g) in both the first groove formation surface and the second groove formation surface.

For example, in the example shown in FIG. 4(a), arrangement patterns in which microgrooves 48 extend in straight lines in the circumferential direction at a fixed pitch are formed in a first groove formation surface 43A. Arrangement patterns in which microgrooves 49 extend in straight lines in the axial direction at a fixed pitch are formed in a second groove formation surface 45A. When the first groove formation surface 43A has been press-fitted to the second groove formation surface 45A in an overlapping state, intersecting arrangement patterns are formed by the microgrooves 48, 49.

In the example shown in FIG. 4(b), inclined arrangement patterns in which microgrooves 48 extend in straight lines in a slanted direction inclined 45 degrees in relation to the circumferential direction and the axial direction at a fixed pitch are formed in the first groove formation surface 43A. Inclined arrangement patterns in which microgrooves 49 extend in straight lines in a slanted direction inclined 45 degrees in an inverse orientation in relation to the circumferential direction and the axial direction at a fixed pitch are formed in the second groove formation surface 45A. Intersecting arrangement patterns are formed by the microgrooves 48, 49, with the first and second groove formation surfaces 43A, 45A in an overlapping state.

Similarly, in the example shown in FIG. 4(c), arrangement patterns in which microgrooves 48 extend in straight lines in the circumferential direction at a fixed pitch are formed in the first groove formation surface 43A. Arrangement patterns in which microgrooves 49 extend in undulations in the circumferential direction at a fixed pitch are formed in the second groove formation surface 45A. Intersecting arrangement patterns of the microgrooves 48, 49 are formed by the microgrooves 48, 49, with the first groove formation surface 43A and the second groove formation surface 45A in an overlapping state.

(Groove Depth at Long-Axis Positions and Short-Axis Positions of Ellipsoidal Shape)

As was previously described, in the strain wave gearing 1, the wave generator 4 is provided with the wave plug 42 in which the ellipsoidally contoured plug external peripheral surface 43 is formed, and the flexible externally toothed gear 3 is caused to flex into an ellipsoidal shape. The externally toothed gear 3 meshes with the rigid internally toothed gear 2 at the portions where the long axis $L_{max}$ of the ellipsoidal shape is positioned. In the meshing portions of the gears 2, 3 formed at the portions where the long axis $L_{max}$ of the ellipsoidal shape is positioned, force is transmitted between the gears 2, 3. Therefore, in the wave generator 4, which retains the externally toothed gear 3 in an ellipsoidally flexed state, considerable surface pressure bears on the portions where the long axis $L_{max}$ of the ellipsoidal shape is positioned, and little surface pressure bears on portions where a short axis $L_{min}$ is positioned.

Figure 5:
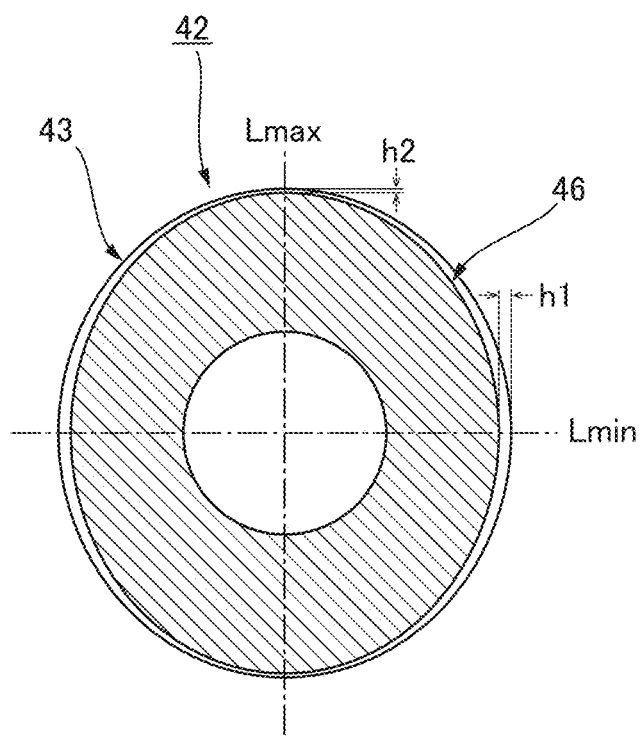
FIG. 5 is an illustrative representation of depths of microgrooves formed in portions where the long axis of an ellipsoidal shape is positioned and portions where the short axis is positioned in a groove formation surface.

Consequently, in a groove formation surface, the microgrooves formed in the portions where the long axis $L_{max}$ of the ellipsoidal shape is positioned can be made shallower, these portions being where considerable surface pressure bears, and the microgrooves formed in the portions where the short axis $L_{min}$ of the ellipsoidal shape is positioned, these portions being where little surface pressure bears, can be deepened so as to be able to retain a greater amount of adhesive. For example, in a case in which the plug external peripheral surface 43 is a groove formation surface and microgrooves 46 extending in a straight line in the circumferential direction are formed (the case shown in FIG. 3(a)), the groove depth of the microgrooves 46 is established as shown in, for example, the illustrative representation in FIG. 5. The depth of the microgrooves 46 is exaggerated in this representation. Along the circumferential direction in the plug external peripheral surface 43 of the wave plug 42 as shown in representation, the microgrooves 46 have a maximum depth $h_1$ in the portions where the short axis $L_{min}$ of the ellipsoidal shape is positioned and a minimum depth $h_2$ in the portions where the long axis $L_{max}$ is positioned. Additionally, the groove depth gradually decreases from the maximum depth $h_1$ to the minimum depth $h_2$ along the circumferential direction.

Other Embodiments

In the example described above, microgrooves are formed as adhesive-retaining grooves by laser processing. The adhesive-retaining grooves can be formed via other methods such as machining, etching, and sandblasting. Depending on the circumstances, millimeter-order adhesive-retaining grooves can also be formed. Furthermore, no particular mention was made of the cross-sectional shape of the adhesive-retaining grooves, but grooves of various cross-sectional shapes can be used, such as rectangular cross-section grooves, semicircular cross-section grooves, and V grooves.

The invention claimed is:

1. A wave generator for a strain wave gearing, the wave generator comprising a rigid wave plug and a wave bearing,
   an inner-race inner peripheral surface of the wave bearing being secured by press-fitting and an adhesive to a non-circularly contoured plug external peripheral surface of the wave plug; and
   one of the plug external peripheral surface and the inner-race inner peripheral surface having a first groove formation surface in which adhesive-retaining grooves capable of retaining the adhesive are formed, and the other thereof having a second groove formation surface in which the adhesive-retaining grooves capable of retaining the adhesive are formed;
   wherein adhesive-retaining grooves are microgrooves being of no greater than micrometer-order width and depth;
   each of the first and second groove formation surfaces is formed with an arrangement pattern having a plurality of the microgrooves; and
   wherein the arrangement pattern is:
   a first-direction arrangement pattern, in which microgrooves extend in straight lines or curved lines in a first direction at a fixed pitch;
   a second-direction arrangement pattern, in which microgrooves extend in straight lines or curved lines in a second direction at a fixed pitch, the second direction being different from the first direction; or
   an intersecting arrangement pattern, in which the first-direction arrangement pattern and the second-direction arrangement pattern are formed in an intersecting state.

2. The wave generator for the strain wave gearing according to claim 1,
   wherein the first groove formation surface is formed with the first direction arrangement pattern; and
   the second groove formation surface is formed with the second-direction arrangement pattern, and
   wherein each of the first and second direction is:
   a circumferential direction of the first and second groove formation surfaces;
   an axial direction orthogonal to the circumferential direction; or
   an oblique direction inclined relative to the circumferential direction and the axial direction.

3. The wave generator for a strain wave gearing according to claim 1,
   wherein the plug outer peripheral surface has an ellipsoidal shape; and
   in the groove formation surface, a depth of the microgrooves formed in portions where a long axis of the ellipsoidal shape is positioned is shallower than a depth of the microgrooves formed in portions where a short axis of the ellipsoidal shape is positioned.

4. A strain wave gearing comprising:
   a rigid internally toothed gear;
   a flexible externally toothed gear; and
   the wave generator as set forth in claim 1.

5. A wave generator for a strain wave gearing, the wave generator comprising:
   a rigid wave plug and a wave bearing,
   an inner-race inner peripheral surface of the wave bearing being secured by press-fitting and an adhesive to a non-circularly contoured plug external peripheral surface of the wave plug; and
   one of the plug external peripheral surface and the inner-race inner peripheral surface having a groove formation surface in which adhesive-retaining grooves capable of retaining the adhesive are formed;
   wherein adhesive-retaining grooves are microgrooves being of no greater than micrometer-order width and depth;
   the groove formation surface is formed with an arrangement pattern having a plurality of the microgrooves; and
   wherein the arrangement pattern is:
   a first-direction arrangement pattern, in which microgrooves extend in straight lines or curved lines in a first direction at a fixed pitch;
   a second-direction arrangement pattern, in which microgrooves extend in straight lines or curved lines in a second direction at a fixed pitch, the second direction being different from the first direction; or
   an intersecting arrangement pattern, in which the first-direction arrangement pattern and the second-direction arrangement pattern are formed in an intersecting state, and
   wherein the plug outer peripheral surface has an ellipsoidal shape; and
   in the groove formation surface, a depth of the microgrooves formed in portions where a long axis of the ellipsoidal shape is positioned is shallower than a depth of the microgrooves formed in portions where a short axis of the ellipsoidal shape is positioned.

6. The wave generator for the strain wave gearing according to claim 5,
   wherein the groove formation surface is formed with the first-direction arrangement pattern, and
   the first direction is:
   a circumferential direction of the groove formation surface;
   an axial direction orthogonal to the circumferential direction; or
   an oblique direction inclined relative to the circumferential direction and the axial direction.

7. The wave generator for the strain wave gearing according to claim 5,
   wherein the groove formation surface is formed with the intersecting arrangement pattern, and
   each of the first and second directions is:
   a circumferential direction of the groove formation surface;
   an axial direction orthogonal to the circumferential direction; or
   an oblique direction inclined relative to the circumferential direction and the axial direction.

8. A strain wave gearing comprising:
   a rigid internally toothed gear;

a flexible externally toothed gear; and
the wave generator as set forth in claim 5.

9. The wave generator for the strain wave gearing according to claim 5, wherein:
- both of the plug external peripheral surface and the inner-race inner peripheral surface having a groove formation surface in which adhesive-retaining grooves capable of retaining the adhesive are formed; and
- each of the groove formation surfaces is formed with an arrangement pattern having a plurality of the micro-grooves.

* * * * *